US010834180B2

(12) United States Patent
Crowder et al.

(10) Patent No.: US 10,834,180 B2
(45) Date of Patent: Nov. 10, 2020

(54) TIME AND LOCATION-BASED TREND PREDICTION IN A CONTENT DELIVERY NETWORK (CDN)

(71) Applicant: Level 3 Communications, LLC, Broomfield, CO (US)

(72) Inventors: William Crowder, Camarillo, CA (US); Christopher Newton, Westlake Village, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 122 days.

(21) Appl. No.: 15/727,704

(22) Filed: Oct. 9, 2017

(65) Prior Publication Data

US 2019/0109896 A1  Apr. 11, 2019

(51) Int. Cl.
*H04L 29/08* (2006.01)

(52) U.S. Cl.
CPC ...... *H04L 67/1008* (2013.01); *H04L 67/1021* (2013.01); *H04L 67/2847* (2013.01)

(58) Field of Classification Search
CPC .................................................. H04L 65/4084
See application file for complete search history.

(56) References Cited

U.S. PATENT DOCUMENTS

| 7,929,429 | B2 | 4/2011 | Bornstein et al. | |
|---|---|---|---|---|
| 8,719,337 | B1 * | 5/2014 | Islam | H04L 65/60 709/203 |
| 2003/0229638 | A1 * | 12/2003 | Carpenter | G06Q 30/02 |
| 2009/0248787 | A1 * | 10/2009 | Sivasubramanian | H04L 29/08729 709/201 |
| 2012/0246273 | A1 * | 9/2012 | Bornstein | H04L 29/06 709/217 |
| 2013/0204961 | A1 * | 8/2013 | Fliam | G06F 3/0649 709/214 |
| 2014/0143320 | A1 * | 5/2014 | Sivasubramanian | H04L 67/26 709/203 |
| 2014/0173067 | A1 | 6/2014 | Newton et al. | |
| 2015/0067051 | A1 * | 3/2015 | Kim | H04L 67/06 709/204 |
| 2017/0054800 | A1 | 2/2017 | DiVincenzo | |
| 2018/0295204 | A1 * | 10/2018 | Westphal | H04L 67/10 |

OTHER PUBLICATIONS

International Search Report and Written Opinion of the International Searching Authority, dated Aug. 8, 2018, Int'l Appl. No. PCT/US18/035392, Int'l Filing Date May 31, 2018; 10 pgs.
International Preliminary Report on Patentability, dated Apr. 23, 2020, Int'l Appl. No. PCT/US18/035392, Int'l Filing Date May 31, 2018; 9 pgs.

* cited by examiner

*Primary Examiner* — Ramy M Osman
*Assistant Examiner* — Sm Z Islam (57) ABSTRACT

A content delivery (CD) network delivers content on behalf of multiple content providers. A method includes determining that certain content is trending in a first geographic region during a first time period; and, based on the determining, causing the certain content to be prefetched by the CDN in a second geographic region by a given time after said first time period, wherein, during the first time period, the time in the second geographic region is earlier than the time in the first geographic region.

18 Claims, 4 Drawing Sheets

TIME AND LOCATION-BASED TREND PREDICTION IN A CONTENT DELIVERY NETWORK (CDN)

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to content delivery and content delivery networks. More specifically, this invention relates to predictive load mitigation and control in content delivery networks (CDNs).

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary

As used herein, unless used otherwise, the following terms or abbreviations have the following meanings:
CD means content delivery;
CDN or CD network means content delivery network;
DNS means domain name system;
IP means Internet Protocol.
A "mechanism" refers to any device(s), process(es), routine(s), service(s), module(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Description

A content delivery network (CDN) distributes content (e.g., resources) efficiently to clients on behalf of one or more content providers, preferably via a public Internet. Content providers provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content with fewer delays.

A content provider that uses a CDN may be referred to as a CDN subscriber or customer.

Figure 1:
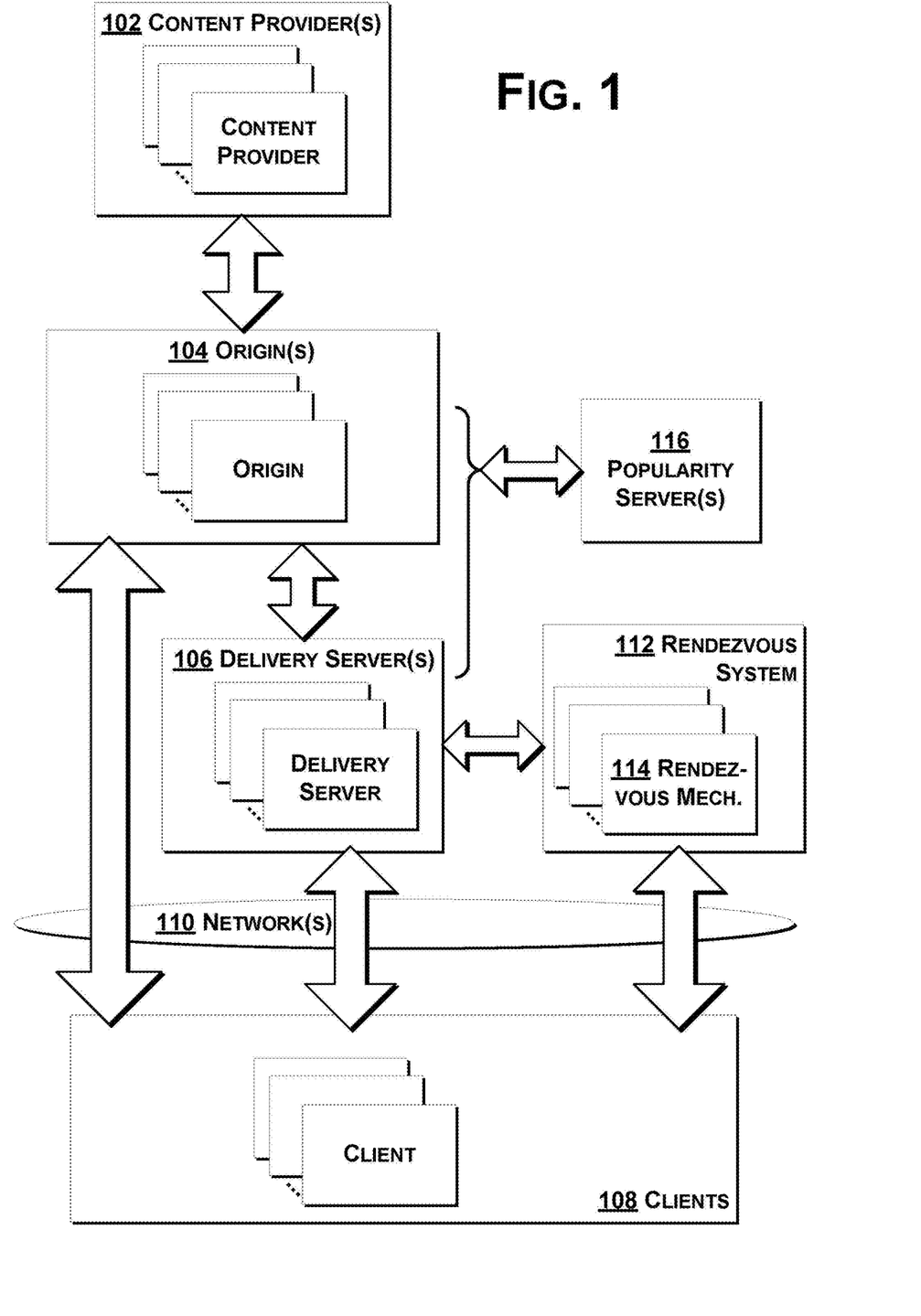
FIGS. 1-2 depicts aspects of a content delivery network (CDN) according to exemplary embodiments hereof.

FIG. 1 shows aspects of an exemplary CDN in which one or more content providers (or subscribers) 102 provide content via one or more origin sources 104 and delivery services (servers) 106 to clients 108 via one or more networks 110. The delivery services (servers) 106 may form a delivery network from which clients 108 may obtain content. The delivery services 106 may be logically and/or physically organized hierarchically and may include edge caches.

A CDN provider typically maintains and operates content servers or server clusters (groups of multiple servers), e.g., delivery servers 106, at multiple locations in and around the CDN. The servers or server clusters may, e.g., be located at numerous different geographic regions (e.g., metropolitan areas) so that content can be stored proximate to users who request the content. As noted above, a CDN often includes servers at the so-called edge of the network (e.g., so-called "edge servers") and servers within the core of the network (e.g., so-called "origin servers"). Origin servers may store or retrieve content and furnish the content to the edge servers, which may in turn cache the content for later distribution. One or more intermediate tiers of servers may be used between the origin servers and the edge servers.

As should be appreciated, components of a CDN (e.g., delivery servers or the like) may use the CDN to deliver content to other CDN components. Thus a CDN component may itself be a client of the CDN. For example, the CDN may use its own infrastructure to deliver CDN content (e.g., CDN control and configuration information) to CDN components.

Content associated with or provided by a particular content provider or subscriber may be referred to as a property. A property may be, e.g., a website and related content, and typically comprises multiple resources. A CDN may provide one or more properties associated with and/or on behalf of one or more content providers. That is, a CDN may serve content on behalf of multiple subscribers, and each particular subscriber may have multiple resources or properties associated therewith that are to be served by the CDN. A content provider may have more than one property, and thus a CDN may serve/provide one or more properties associated with and/or on behalf of a particular content provider.

Exemplary CDNs are described in U.S. Pat. Nos. 8,060,613 and 8,825,830, the entire contents of both of which are fully incorporated herein by reference in their entirety and for all purposes.

With reference again to FIG. 1, client requests (e.g., for content) may be associated with delivery server(s) 106 by a rendezvous system 112 comprising one or more rendezvous mechanism(s) 114, e.g., in the form of one or more rendezvous networks. The rendezvous mechanism(s) 114 may be implemented, at least in part, using or as part of a DNS system, and the association of a particular client request (e.g., for content) with one or more delivery servers may be done as part of DNS processing associated with that particular client request (e.g., DNS processing of a domain name associated with the particular client request).

As should be appreciated, typically, multiple delivery servers 106 in the CDN can process or handle any particular client request for content (e.g., for one or more resources). Preferably the rendezvous system 112 associates a particular client request with one or more "best" or "optimal" (or "least worst") delivery servers 106 (or clusters) to deal with that particular request. The "best" or "optimal" delivery server(s) 106 (or cluster(s)) may be one(s) that is (are) close to the client (by some measure of network cost) and that is (are) not overloaded. Preferably the chosen delivery server(s) 106 (or cluster(s)) (i.e., the delivery server(s) or cluster(s) chosen by the rendezvous system 112 for a client request) can deliver the requested content to the client or can direct the client, somehow and in some manner, to somewhere where the client can try to obtain the requested content. A chosen delivery server 106 (or cluster) need not have the requested content at the time the request is made, even if that chosen delivery server 106 (or cluster) eventually serves the requested content to the requesting client.

It is sometimes desirable to prefetch and/or cache content on delivery servers 106. As should be appreciated, prefetched content is generally cached. Accordingly, as used herein, the term "prefetch" (or "pre-fetch") means "fetch and cache," e.g., in anticipation of future requests. This is particularly useful when the content is determined to be popular. In this regard, a CDN may include or use one or more popularity servers to track and/or predict resource popularity. Popularity information may be determined, e.g., from prior requests for content.

Following the Sun—Time and Location Based Popularity Prediction

Figure 2:
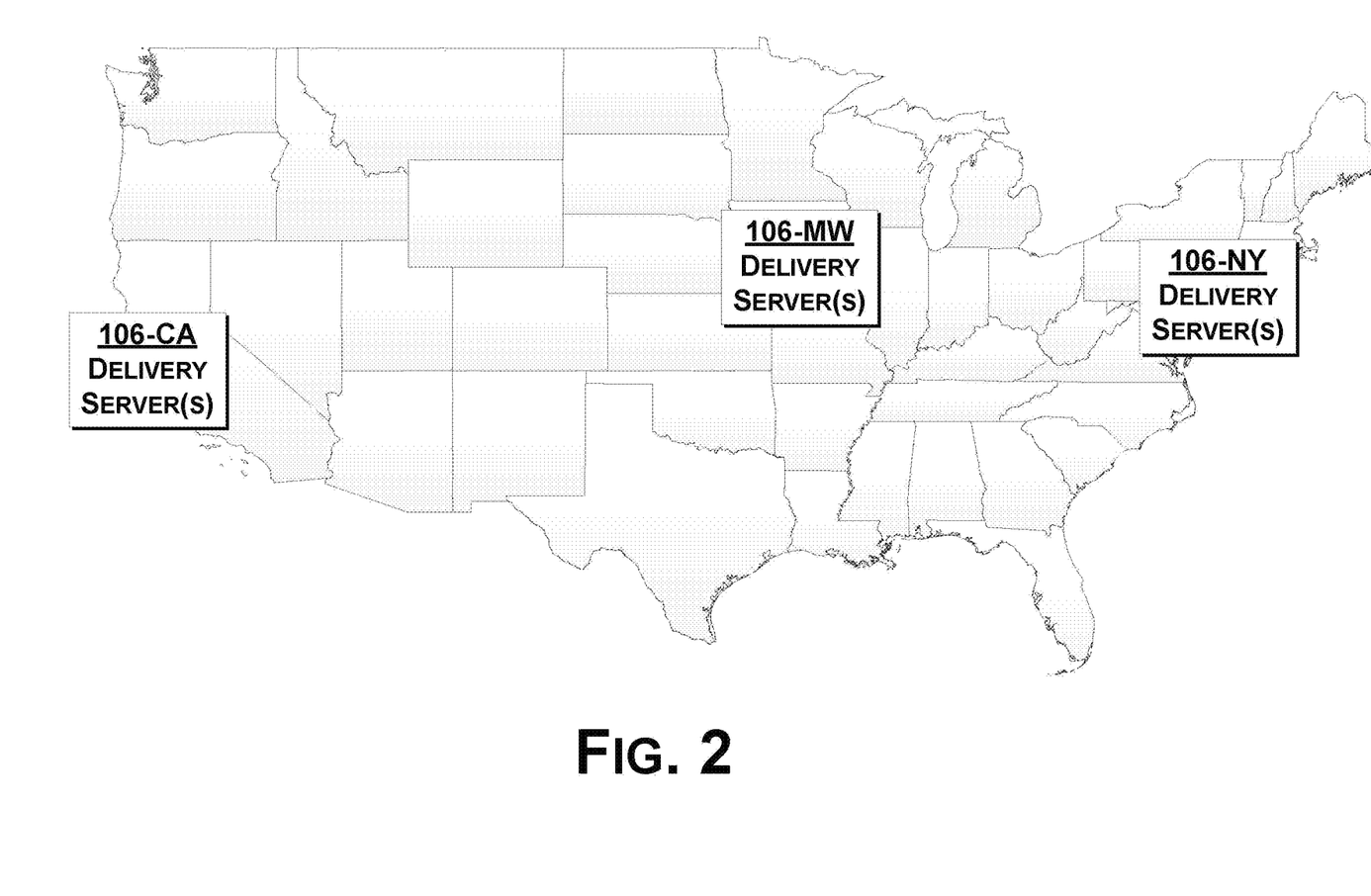

The delivery servers (106 in FIG. 1) may include logical and/or physical groups of servers in different geographical locations. With reference now to FIG. 2, there may, e.g., by groups of servers 106-CA in California, 106-MW in Chicago, and 106-NY in New York. While not always the case, it is likely that a client request for content on the U.S. East Coast will be served by a geographically nearby server, e.g., one in the group 106-NY. Similarly, while not always the case, it is likely that client request from Chicago will be severed from a server in the group 106-MW, and a client request from California will be severed from a server in the group 106-CA.

In this example, there is a one-hour time difference between the locations of the servers in New York and those in Chicago, and there is a three-hour time difference between the locations of the servers in New York and those in California.

The inventor realized that content that is trending or popular in one location, especially in the morning, may also trend or be popular in other locations (to the West) as they wake up and come online. Accordingly, trends and popularity at one location can be used to prefetch data to other locations that are earlier in time. So, e.g., if a news story becomes popular on the U.S. East Coast in the morning, then this same story might be popular in the Mid-West and hour later and in California three hours later. Using, e.g., the popularity servers 116, information can be provided to the Mid-West and California delivery servers 106-MW, 106-CA to require or suggest that they prefetch and cache that content. Similarly, if content is trending or popular in California late at night, that same content may trend or be popular on the U.S. East Coast the next morning.

Determining whether or not certain content is trending and becoming popular may be based on requests made at the CDN for that content. For example, if the CDN servers in New York receive a lot of requests for certain content, then that content might be considered popular. Such a determination may be made by the popularity servers 116, based, at least in part, on the number of requests for that content relative to other content. Popularity and trends may also be determined based on external factors, e.g., references to certain content on social media web sites and the like. For example, if content is trending on Twitter or Facebook, then resources related to that content may be treated as potentially popular or trending in the CDN.

While this kind of popularity and trend information may be useful at all times, it is particularly useful when one region (where the content is popular and trending) is geographically east of another region, and where the second region is, in effect, still asleep. In other words, where most people in the second region are not yet online. For example, content that is trending in New York at 7 AM might also trend in Los Angeles when more people there wake up and come online (a few hours later). Similarly, content that is trending in Europe in the morning might also trend in New York a few hours later.

As described, the time-location based popularity is used to predict corresponding time-based popularity in westward locations. And such predictions are used to affect prefetching and caching of content.

Recall from above that the CDN delivers content on behalf of subscribers. In exemplary embodiments a subscriber's content is served by a subset of the CDN's servers, where the subset is bound to subscriber's content (or vice versa).

Binding is the process of establishing that requests for certain subscriber services (or other internal requests) will be available at certain endpoints in the CDN. Aspects of dynamic binding are described in U.S. Published Patent Application No. 20110276679, filed May 4, 2010, titled "Dynamic Binding For Use In Content Distribution," the entire contents of which are hereby fully incorporated herein by reference for all purposes.

According to exemplary embodiments hereof, if demand on a particular subscriber's content increases, the number of CD servers bound to that content (or to that subscriber) may be increased. That is, if demand on a particular subscriber's content increases, then the size of the subset of CDN servers that handle's that content may increase.

Accordingly, the popularity and trend predictions may also (or instead) be used to re-allocate server bindings and allocations so that sufficient servers will be available to satisfy the demand for the trending/popular content.

Figure 3:
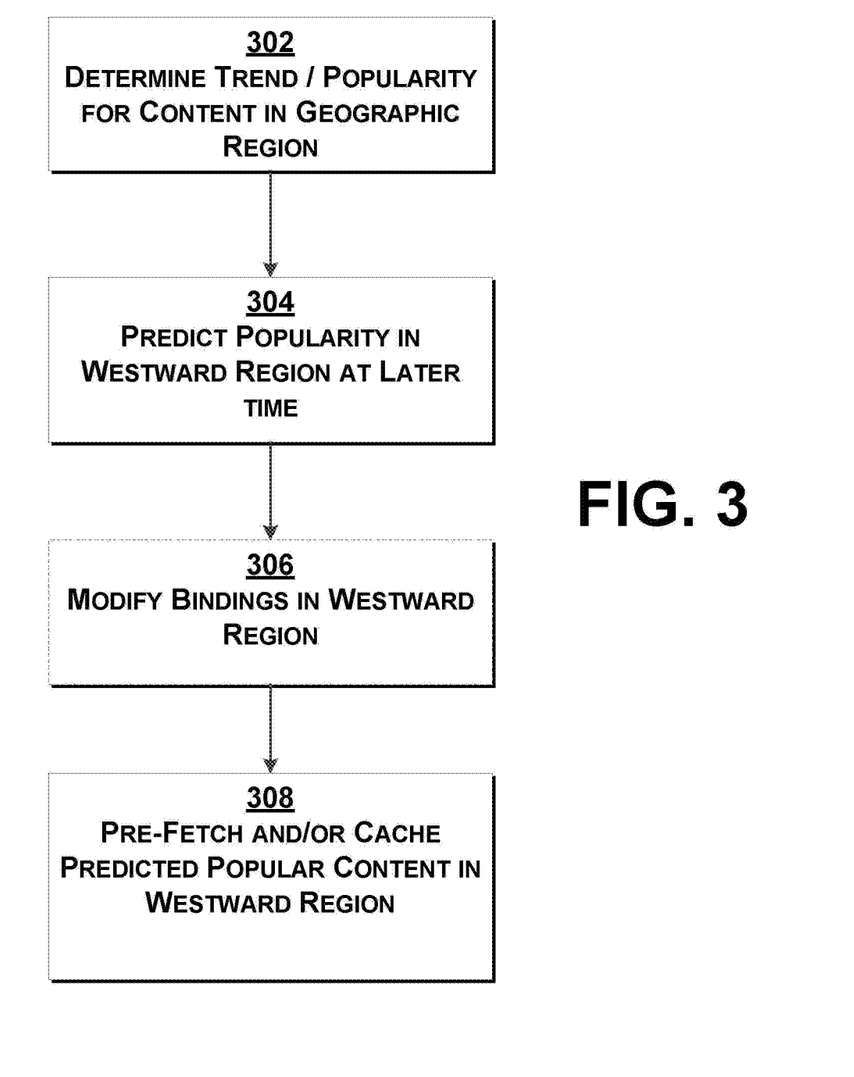
FIG. 3 is a flowchart showing aspects of the system according to exemplary embodiments hereof.

With reference to the exemplary flowchart in FIG. 3, the system determines (at 302) whether certain content is popular and/or trending in a geographic region. Based at least in part on the determining (in 302), the system predicts (at 304) whether the content will trend or be popular in a westward region at a later time. Based at least in part on the prediction (in 304), the bindings of subscriber and/or content to servers in one or more westward regions may be modified (at 306). And, based at least in part on the prediction (in 304), servers in one or more westward regions may (at 308) prefetch predicted popular content. Note that the binding modifications (at 306) and prefetching (at 308) need not take place immediately, but preferably occurs before a time at which users are expected to start requesting that content. If bindings are modified (at 306), then preferably this occurs before any prefetching (in 308). For example, if content is trending at 7 AM in New York, then that content may be likely to trend by, say, 6 AM, in Los Angeles. Accordingly, servers in California (e.g., servers 106-CA) should prefetch their content by 6 AM California time.

Those of ordinary skill in the art will appreciate and understand, upon reading this description, that the time/location-based trend information may be used alone or in conjunction with other popularity and trend information.

In some embodiments, the system may determine (e.g., score) the success of the prefetch strategy. This scoring may be done for particular content. For example, if content was prefetched but not requested as anticipated, then that would lower the score for that content. This allows for auto-tuning the mechanism in response to prior successes or failures, either noting that prefetched content was not requested, or noting that content requested earlier/eastward had not been prefetched.

Those of ordinary skill in the art will realize and appreciate, upon reading this description, that some content will likely only be of local (i.e., geographically local) interest, even if it is trending locally. For example, content about a local event may be of importance in one region but not others. Similarly, content from certain CDN subscribers may only be of local interest. Accordingly, in some embodiments, for certain subscribers or a given set of content (e.g., local news in a region not likely to cause excitement or interest elsewhere), the prefetching mechanism may be disabled or otherwise tuned in response to the score.

In addition, in some embodiments, the requests that were not prefetched but should have been, are tracked, thereby enabling the strategy for similar content in the future.

Computing

The services, mechanisms, operations and acts shown and described above are implemented, at least in part, by software running on one or more computers of a CDN.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 4:
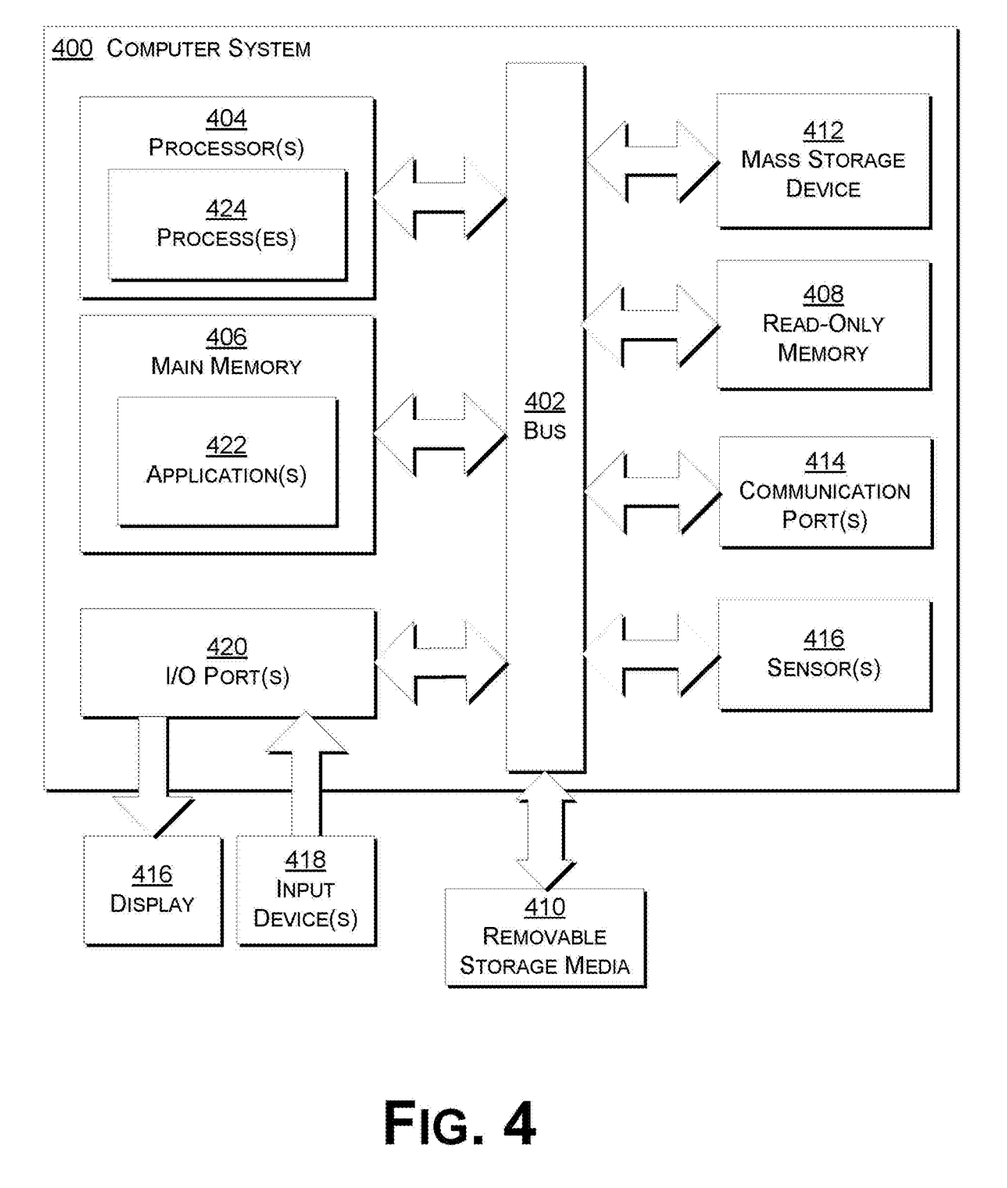
FIG. 4 depicts aspects of computing according to exemplary embodiments hereof.

FIG. 7 is a schematic diagram of a computer system 400 upon which embodiments of the present disclosure may be implemented and carried out.

According to the present example, the computer system 400 includes a bus 402 (i.e., interconnect), one or more processors 404, a main memory 406, read-only memory 408, removable storage media 410, mass storage 412, and one or more communications ports 414. Communication port 414 may be connected to one or more networks by way of which the computer system 400 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 404 can be any known processor, such as, but not limited to, an Intel® Itanium® or Itanium 2® processor(s), AMD® Opteron® or Athlon MP® processor(s), or Motorola® lines of processors, and the like. Communications port(s) 414 can be any of an RS-232 port for use with a modem based dial-up connection, a 10/100 Ethernet port, a Gigabit port using copper or fiber, or a USB port, and the like. Communications port(s) 414 may be chosen depending on a network such as a Local Area Network (LAN), a Wide Area Network (WAN), a CDN, or any network to which the computer system 400 connects. The computer system 400 may be in communication with peripheral devices (e.g., display screen 416, input device(s) 418) via Input/Output (I/O) port 420.

Main memory 406 can be Random Access Memory (RAM), or any other dynamic storage device(s) commonly known in the art. Read-only memory 408 can be any static storage device(s) such as Programmable Read-Only Memory (PROM) chips for storing static information such as instructions for processor 404. Mass storage 412 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 402 communicatively couples processor(s) 404 with the other memory, storage, and communications blocks. Bus 402 can be a PCI/PCI-X, SCSI, a Universal Serial Bus (USB) based system bus (or other) depending on the storage devices used, and the like. Removable storage media 410 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 406 is encoded with application(s) 422 that supports the functionality discussed herein (the application 422 may be an application that provides some or all of the functionality of the CD services described herein, including rendezvous services). Application(s) 422 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 404 accesses main memory 406 via the use of bus 402 in order to launch, run, execute, interpret or otherwise perform the logic instructions of the application(s) 422. Execution of application(s) 422 produces processing functionality of the service related to the application(s). In other words, the process(es) 424 represent one or more portions of the application(s) 422 performing within or upon the processor(s) 404 in the computer system 400.

It should be noted that, in addition to the process(es) 424 that carries (carry) out operations as discussed herein, other embodiments herein include the application 422 itself (i.e., the un-executed or non-performing logic instructions and/or data). The application 422 may be stored on a computer readable medium (e.g., a repository) such as a disk or in an optical medium. According to other embodiments, the application 422 can also be stored in a memory type system such as in firmware, read only memory (ROM), or, as in this example, as executable code within the main memory 406 (e.g., within Random Access Memory or RAM). For example, application 422 may also be stored in removable storage media 410, read-only memory 408 and/or mass storage device 412.

Those skilled in the art will understand that the computer system 400 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the term "content" means, without limitation, any kind of data, in any form, regardless of its representation and regardless of what it represents. Content may include, without limitation, static and/or dynamic images, text, audio content, including streamed audio, video content, including streamed video, web pages, computer programs, documents, files, and the like. Some content may be embedded in other content, e.g., using markup languages such as hypertext markup language (HTML) and extensible markup language (XML). Content includes content that is created or formed or composed specifically in response to a particular request. The term "resource" is sometimes used herein to refer to content.

As used herein, including in the claims, the phrase "at least some" means "one or more," and includes the case of only one. Thus, e.g., the phrase "at least some services" means "one or more services", and includes the case of one service.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of CDN services" may include one or more CDN services.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram, the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer-implemented method, in a content delivery (CD) network, wherein said CD network (CDN) delivers content on behalf of multiple content providers, the method comprising:
   (A) determining that certain content is trending in a first geographic region during a first time period, the certain content provided to the CDN by a first content provider of the multiple content providers;
   (B) based on said determining in (A), determining a given time by which to prefetch the certain content in a second geographic region, wherein the given time is determined based on a time-zone difference between the first geographic region and the second geographic region;
   (C) based on the determining in (A), increasing a number of CD servers bound to said first content provider in said second geographic region;
   (D) causing said certain content to be prefetched by at least one cache of said CDN in the second geographic region by the given time;
   (E) determining, after the given time, a score for the certain content based on requests for the certain content in the second geographic region;
   (F) determining that second content provided to the CDN by the first content provider is trending in the first geographic region during a subsequent time period; and
   (G) determining, based on the score, whether to cause the second content provided by the first content provider to be prefetched by the at least one cache of the CDN in the second geographic region.

2. The method of claim 1 wherein said determining in (A) is based on requests made at the CDN for said certain content.

3. The method of claim 2 wherein said content comprises one or more resources served by the CDN on behalf of the first content provider to the CDN.

4. The method of claim 1 wherein said determining in (A) is based on references to said certain content outside of said CDN.

5. The method of claim 4 wherein said references to said certain content were made on one or more social networking web sites.

6. The method of claim 1 wherein said second geographic region is west of said first geographic region.

7. The method of claim 1 wherein said second geographic region is in an earlier time zone than said first geographic region.

8. An article of manufacture comprising a nontransitory computer-readable medium having program instructions stored thereon, the program instructions, operable on a computer system in a content delivery network (CDN), said device implementing at least one content delivery (CD) service, wherein execution of the program instructions by one or more processors of said computer system causes the one or more processors to carry out the acts of:
   (A) determining that certain content is trending in a first geographic region during a first time period, the certain content provided to the CDN by a first content provider;
   (B) based on said determining in (A), determining a given time by which to prefetch the certain content in a second geographic region, wherein the given time is determined based on a time-zone difference between the first geographic region and the second geographic region;
   (C) based on the determining in (A), increasing a number of CD servers bound to said first content provider in said second geographic region;
   (D) causing said certain content to be prefetched by at least one cache of said CDN in the second geographic region by the given time;
   (E) determining, after the given time, a score for the certain content based on requests for the certain content in the second geographic region;
   (F) determining that second content provided to the CDN by the first content provider is trending in the first geographic region during a subsequent time period; and
   (G) determining, based on the score, whether to cause the second content provided by the first content provider to be prefetched by the at least one cache of the CDN in the second geographic region.

9. The article of manufacture of claim 8, wherein said determining in (A) is based on requests made at the CDN for said certain content.

10. The article of manufacture of claim 9, wherein said content comprises one or more resources served by the CDN on behalf of the first content provider to the CDN.

11. The article of manufacture of claim 8, wherein said determining in (A) is based on references to said certain content outside of said CDN.

12. The article of manufacture of claim 11, wherein said references to said certain content were made on one or more social networking web sites.

13. The article of manufacture of claim 8, wherein said second geographic region is west of said first geographic region.

14. The article of manufacture of claim 8 wherein said second geographic region is in an earlier time zone than said first geographic region.

15. A device in a content delivery network (CDN), wherein said CDN delivers content on behalf of at least one content provider, said device implementing a content delivery (CD) service, the device comprising:
   at least one processor;
   memory, operatively connected to the at least one processor and containing instructions that, when executed by the at least one processor, cause the device to perform a method, the method comprising:
      (A) determining that certain content is trending in a first geographic region during a first time period, the certain content provided to the CDN by a first content provider of the at least one content provider;
      (B) based on said determining in (A), determining a given time by which to prefetch the certain content in a second geographic region, wherein the given time is determined based on a time-zone difference between the first geographic region and the second geographic region;
      (C) based on the determining in (A), increasing a number of CD servers bound to said first content provider in said second geographic region;

(D) causing said certain content to be prefetched by at least one cache of said CDN in the second geographic region by the given time;
(E) determining, after the given time, a score for the certain content based on requests for the certain content in the second geographic region;
(F) determining that second content provided to the CDN by the first content provider is trending in the first geographic region during a subsequent time period; and
(G) determining, based on the score, whether to cause the second content provided by the first content provider to be prefetched by the at least one cache of the CDN in the second geographic region.

16. The device of claim 15, wherein said determining in (A) is based on requests made at the CDN for said certain content.

17. The device of claim 15, wherein said determining in (A) is based on references to said certain content outside of said CDN.

18. The device of claim 15, wherein said references to said certain content were made on one or more social networking web sites.

\* \* \* \* \*